United States Patent [19]

Weder et al.

[11] Patent Number: 5,303,506
[45] Date of Patent: Apr. 19, 1994

[54] BASKET FLOWER POT WITH DECORATIVE COVER

[75] Inventors: Donald E. Weder, Highland, Ill.;
Franklin J. Craig, Valley Park, Mo.;
William F. Straeter, Breese, Ill.;
Joseph G. Straeter, Highland, Ill.;
John Bergstrand, Highland, Ill.

[73] Assignee: Highland Supply Corporation, Highland, Ill.

[21] Appl. No.: 960,172

[22] Filed: Oct. 13, 1992

Related U.S. Application Data

[63] Continuation of Ser. No. 852,740, Mar. 16, 1992, abandoned, which is a continuation of Ser. No. 704,908, May 21, 1991, abandoned, which is a continuation of Ser. No. 398,779, Aug. 25, 1989, abandoned, which is a continuation-in-part of Ser. No. 365,767, Jun. 13, 1989, abandoned, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[30] Foreign Application Priority Data

| | | | |
|---|---|---|---|
| Jul. 23, 1991 | [JP] | Japan | 3-182319 |
| Oct. 31, 1991 | [JP] | Japan | 3-286562 |
| Nov. 20, 1991 | [JP] | Japan | 3-304933 |
| Dec. 12, 1991 | [JP] | Japan | 3-328779 |

[51] Int. Cl.⁵ .............................................. A01G 9/02
[52] U.S. Cl. ............................................. 47/67; 47/72
[58] Field of Search ............... 47/66, 67, 72, 76, 71, 47/41.01, 41.11

[56] References Cited

U.S. PATENT DOCUMENTS

| | | |
|---|---|---|
| 239,987 | 4/1881 | Shellenberger . |
| 254,659 | 4/1880 | Karotseris . |
| 292,562 | 11/1887 | Weder et al. . |
| 292,563 | 11/1887 | Weder et al. . |
| 293,224 | 12/1887 | Weder et al. . |
| 293,774 | 1/1888 | Weder et al. . |
| 293,775 | 1/1888 | Weder et al. . |
| 716,668 | 12/1902 | Cheney . |
| 732,889 | 7/1903 | Paver . |
| 923,663 | 6/1909 | Kroeger . |
| 1,002,346 | 9/1911 | Weeks . |
| 1,052,379 | 2/1913 | Ranken . |
| 1,069,675 | 8/1913 | Claussen . |
| 1,206,708 | 11/1916 | Hutchins . |

(List continued on next page.)

FOREIGN PATENT DOCUMENTS

| | | | |
|---|---|---|---|
| 162079 | of 1949 | Austria | 47/67 |
| 163453 | 12/1985 | European Pat. Off. . | |
| 2036163 | 12/1970 | France . | |
| 2272914 | 1/1976 | France . | |
| 2489126 | 3/1982 | France . | |
| 2651663 | 9/1989 | France | 47/66 |
| 8101464 | 10/1982 | Netherlands . | |
| 161005 | 4/1933 | Switzerland . | |
| 274167 | 3/1951 | Switzerland . | |
| 560532 | 9/1972 | Switzerland . | |
| 1204647 | 9/1970 | United Kingdom . | |

OTHER PUBLICATIONS

Exhibit A. Curtis Wagner Co., Inc., Houston, Tex., shows thick, stiff shiny red plastic pot cover with large scalloped border. (Photograph) Date unknown.

(List continued on next page.)

Primary Examiner—Carl D. Friedman
Assistant Examiner—Wynn Wood
Attorney, Agent, or Firm—Dunlap, Codding & Lee

[57] ABSTRACT

A decorative cover which is connected to a hanging basket flower pot. The hanging basket flower pot is adapted to be hangingly supported from the a support surface. In one embodiment, the decorative cover is adapted to be hangingly supported from the support surface for providing a hanging basket type of flower pot. The decorative cover also is adapted to be hangingly supported from a support surface with a flower pot supported therein. A sheet of material with reinforcing means adapted for cooperating with the sheet of material for maintaining the sheet of material in a formed shape when the sheet of material is formed.

6 Claims, 2 Drawing Sheets

5,303,506

Page 2

U.S. PATENT DOCUMENTS

| | | |
|---|---|---|
| 1,421,027 | 6/1922 | Reynolds . |
| 1,421,628 | 7/1922 | Watkins . |
| 1,446,563 | 2/1923 | Hughes . |
| 1,572,548 | 2/1926 | Mattison ............................... 47/67 |
| 1,693,435 | 11/1928 | Clarke . |
| 1,863,216 | 6/1932 | Wordingham . |
| 1,868,853 | 7/1932 | Sievers . |
| 1,920,533 | 8/1933 | Strauss . |
| 1,924,926 | 8/1933 | Gray . |
| 1,951,642 | 3/1934 | Augustin et al. ...................... 47/66 |
| 1,978,631 | 10/1934 | Herrlinger . |
| 1,979,771 | 11/1934 | Potter . |
| 2,076,212 | 4/1937 | Suter et al. . |
| 2,123,075 | 7/1938 | Langa . |
| 2,152,648 | 4/1939 | Jones . |
| 2,278,673 | 4/1942 | Savada et al. . |
| 2,302,259 | 11/1942 | Rothfuss . |
| 2,355,559 | 8/1944 | Renner . |
| 2,411,328 | 11/1946 | MacNab . |
| 2,482,981 | 9/1949 | Kamrass . |
| 2,510,120 | 6/1950 | Leander . |
| 2,529,060 | 11/1950 | Trillich . |
| 2,774,187 | 12/1956 | Smithers . |
| 2,822,287 | 2/1958 | Avery . |
| 2,827,217 | 3/1958 | Clement . |
| 2,845,735 | 8/1958 | Werner . |
| 2,942,823 | 6/1960 | Chapman . |
| 2,967,652 | 1/1961 | Canfield . |
| 3,013,689 | 12/1961 | Shropshire . |
| 3,022,605 | 2/1962 | Reynolds . |
| 3,094,810 | 6/1963 | Kalpin . |
| 3,130,113 | 4/1964 | Silman . |
| 3,271,922 | 9/1966 | Wallerstein et al. . |
| 3,376,666 | 4/1968 | Leonard . |
| 3,488,022 | 11/1967 | Vittori ................................... 47/66 |
| 3,552,059 | 1/1971 | Moore . |
| 3,554,434 | 1/1971 | Anderson . |
| 3,620,366 | 11/1971 | Parkinson . |
| 3,681,105 | 8/1972 | Milutin et al. . |
| 3,775,903 | 12/1973 | Pike . |
| 3,869,828 | 3/1975 | Matsumoto . |
| 3,962,503 | 6/1976 | Crawford . |
| 3,974,960 | 8/1976 | Mitchell . |
| 4,043,077 | 8/1977 | Stonehocker . |

(List continued on next page.)

OTHER PUBLICATIONS

Exhibit B. Jacobson Pot Cover Company of Scranton, Pa. advertising literature. Date of first use unknown.

Exhibit C. Photograph of pot cover, manufacturer unknown, but very similar to #C21 on Exhibit B (Jacobson literature).

Exhibit D. Photocopy of photo of pot cover ("Platform Pot Dresser") made by John Raisen Corp., San Francisco, Calif. Date of first use unknown.

Exhibit E. Photograph of 2-part pot cover system made by Floral Decor, subsidiary of John Henry Co., Lansing, Mich.

Exhibit F. Photo of pot cover made by a Holland company (K.P.I.). Date of first public use believed to be late 1984.

Exhibit G. "The Glass of Frederick Carder", copyright 1971 by P. V. Gardner, showing various styles of glass basket-like vases or containers.

Exhibit H. "Speed Cover®" brochure, published in 1983 by Applicants, showing various pot covers for sale.

Exhibit I. "Speed Cover®" brochure, published in 1983 by Applicants, showing various pot covers for sale.

Exhibit J. Item published in 1936 by Gellman Bros., Minneapolis, Minn. Shows an assortment of paper hats.

Exhibit K. Photo of various other flower pot wrappings, sold in rolls or sheets and used in the floral industry for years.

Exhibit L. Photo of pot cover made of woven straw--like material.

Exhibit M. Photo of basket-type pot cover used in the floral industry.

Exhibit N. "Speed Cover®" brochure, published in 1984 by Applicants, showing various pot covers for sale.

It is also known to shape a sheet of shape-sustaining wrapping material, such as foil, to a pot using a board with a central hole, the diameter being greater than the diameter of the pot, by pushing the pot through the hole pulling the wrapping through through the hole so that the wrapping is gathered around the pot.

U.S. PATENT DOCUMENTS

| Patent No. | Date | Inventor | Class |
|---|---|---|---|
| 4,054,697 | 10/1977 | Reed et al. | |
| 4,118,890 | 10/1978 | Shore. | |
| 4,170,618 | 10/1979 | Adams. | |
| 4,216,620 | 8/1980 | Weder et al. | |
| 4,250,664 | 2/1981 | Remke. | |
| 4,283,032 | 8/1981 | Smith. | |
| 4,297,811 | 11/1981 | Weder. | |
| 4,300,312 | 11/1981 | Weder et al. | |
| 4,338,979 | 7/1982 | Dow. | |
| 4,340,146 | 7/1982 | Stratton. | |
| 4,380,564 | 4/1983 | Cancio et al. | |
| 4,400,910 | 8/1983 | Koudstaal et al. | |
| 4,413,725 | 11/1983 | Bruno et al. | |
| 4,488,697 | 12/1984 | Garvey. | |
| 4,508,223 | 4/1985 | Catrambone. | |
| 4,592,166 | 6/1986 | Tendrup et al. | 47/67 |
| 4,621,733 | 11/1986 | Harris. | |
| 4,646,470 | 3/1987 | Maggio | 47/76 |
| 4,669,693 | 6/1987 | Kagan | 47/67 |
| 4,717,262 | 1/1988 | Roen et al. | |
| 4,733,521 | 3/1988 | Weder et al. | |
| 4,744,171 | 5/1988 | Hilliard | 47/66 |
| 4,773,182 | 9/1988 | Weder et al. | |
| 4,795,601 | 1/1989 | Cheng. | |
| 4,835,834 | 6/1989 | Weder. | |
| 4,914,860 | 4/1990 | Richardson | 47/72 |
| 5,088,234 | 2/1992 | Wong | 47/67 |

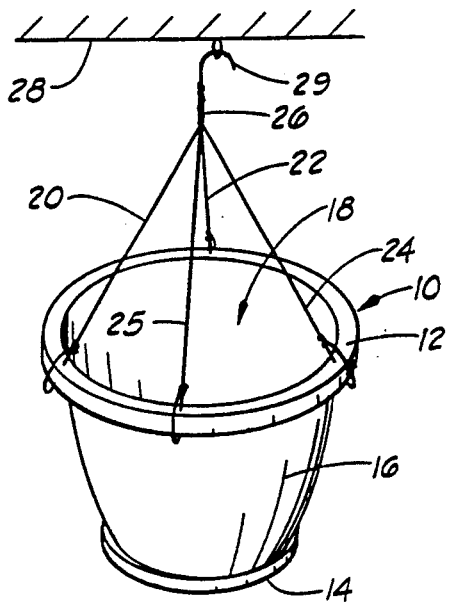
FIG. 1
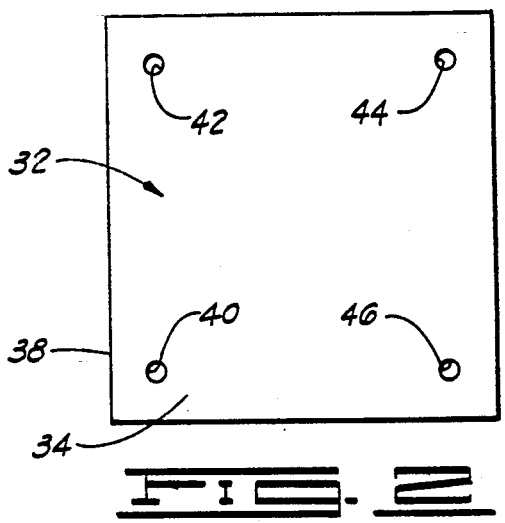
FIG. 2
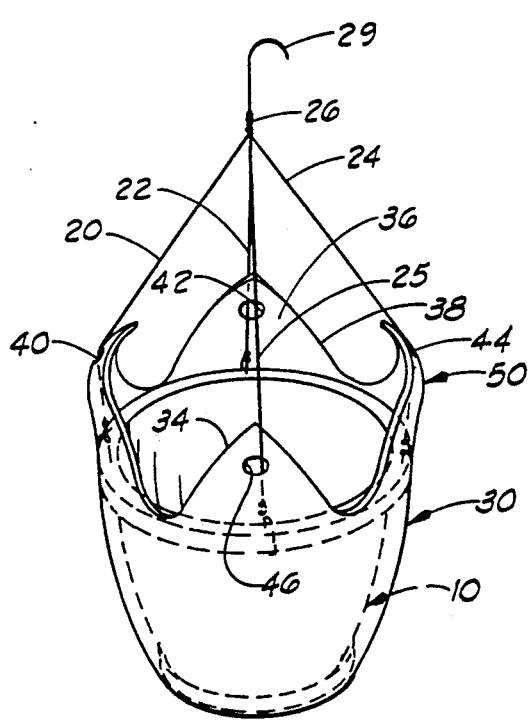
FIG. 3
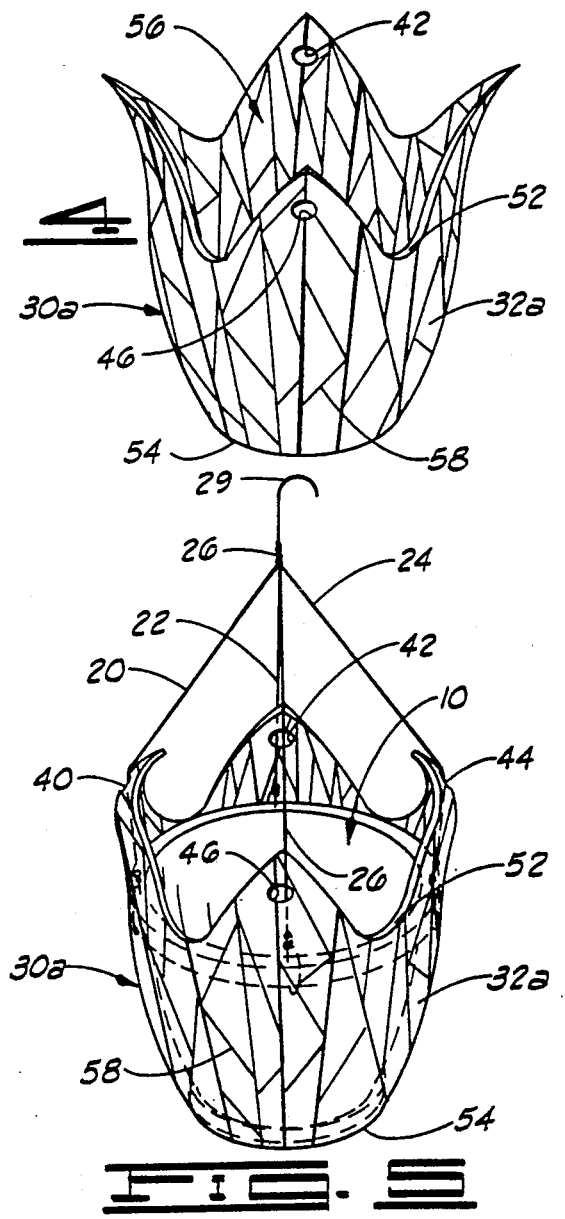
FIG. 4
FIG. 5

5,303,506

BASKET FLOWER POT WITH DECORATIVE COVER

This is a continuation of co-pending application Ser. No. 852,740 filed on Mar. 16, 1992 now abandoned, entitled "HANGING BASKET FLOWER POT WITH DECORATIVE COVER", which was a continuation of U.S. Ser. No. 704,908 filed on May 21, 1991 now abandoned, which was U.S. Ser. No. 398,779, filed Aug. 25, 1989, now abandoned, which was a continuation in part of U.S. Ser. No. 365,767, filed Jun. 13, 1989, now abandoned, which was a continuation of U.S. Ser. No. 219,083, filed Jul. 13, 1988, now U.S. Pat. No. 4,897,031, which was a continuation of U.S. Ser. No. 004,275, filed Jan. 5, 1987, now U.S. Pat. No. 4,773,182, which was a continuation of U.S. Ser. No. 613,080, filed May 22, 1984, which was abandoned.

FIELD OF THE INVENTION

The present invention relates generally to decorative covers for flower pots and, more particularly, but not by way of limitation, to a decorative cover for a hanging basket flower pot.

BRIEF DESCRIPTION OF THE DRAWINGS

FIG. 1 is a partial perspective view of a hanging basket flower pot.

FIG. 2 is a top plan view of a sheet of material for forming a decorative cover in accordance with the present invention.

FIG. 3 is a partial perspective view of the hanging basket flower pot of FIG. 1 with a decorative cover constructed in accordance with the present invention connected thereto, the decorative cover being formed from the sheet of material of FIG. 2.

FIG. 4 is a partial perspective view of a preformed decorative cover made using the sheet of material of FIG. 2.

FIG. 5 is a view similar to FIG. 3, but showing the modified decorative cover of FIG. 4 connected to the flower pot of FIG. 1.

DESCRIPTION OF THE PREFERRED EMBODIMENTS

Figure 6:
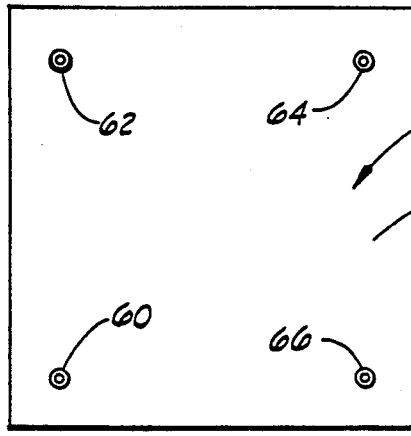
FIG. 6 is a view of a modified sheet of material, similar to the sheet of material shown in FIG. 2, but with ring inserts in the holes in the sheet of material.

Shown in FIG. 1 and designated by the reference numeral 10 is a hanging basket flower pot. The flower pot 10 has an upper end 12, a lower end 14 and an outer peripheral surface 16. A pot opening 18 is formed through the upper end 12 and the pot opening 18 is sized and shaped to accommodate a floral grouping. In many instances, soil also is disposed in the pot opening 18.

Four wires 20, 22, 24 and 25 are connected to the upper end 12 of the flower pot 10. The wires 20, 22, 24 and 25 each extend a distance upwardly from the upper end 12. The wires 20, 22, 24 and 25 are interconnected, such as by twisting together at 26, and the interconnected wires 20, 22, 24 and 25 extend upwardly from the connection 26 and the interconnected wires 20, 22, 24 and 25 are connected to a support surface 28 for hangingly supported the flower pot 10 from the support surface 28. More particularly, a hook 29 is formed with the interconnected wires 20, 22, 24 and 25, and the hook 29 is hooked through a ring or the like which is connected to the support surface 28 for hangingly supporting the flower 10 from the support surface 28.

Flower pots which are adapted to be supported from a support surface, such as a ceiling, and which are constructed and operate exactly like the flower pot 10 shown in FIG. 1 and described above are old and well known in the art. Although the flower pot 10 has been described as being hangable via wires 20, 22, 24 and 25, flower pots of this type also typically are hangingly supported by rope like members and typically are interconnected by a collar like member, rather than or in addition to the twisting described before. The term "wire" or "wires" as used herein is intended to be constructed broad enough to encompass all types of members which may be used to hangingly support a flower pot.

"Floral grouping" as used herein means cut fresh flowers, artificial flowers, other fresh and/or artificial plants or other floral materials and may include other secondary plants and/or ornamentation which add to the aesthetics of the overall floral grouping.

The present invention is directed to providing a decorative cover for the flower pot 10. Shown in FIG. 3 is the flower pot 10 with a decorative cover 30 which is constructed in accordance with the present invention. The decorative cover 30 is made from a sheet of material 32, the sheet of material 32 being shown in FIG. 2.

Shown in FIG. 2 is the sheet of material 32. The sheet of material 32 has an upper surface 34, (FIG. 2), a lower surface 36 (FIG. 3) and an outer peripheral edge 38. Four holes 40, 42, 44 and 46 are formed through the sheet of material 32. Each of the holes 40, 42, 44 and 46 is disposed generally near the outer peripheral edge 38 of the sheet of material 32. Further, in this embodiment, each of the holes 40, 42, 44 and 46 is disposed generally near one of the corners of the sheet of material 32.

The sheet of material 32 is extendable about the outer peripheral surface 16 of the flower pot 10 with the lower surface 36 of the sheet of material 32 being disposed generally adjacent the outer peripheral surface 16 of the flower pot 10. The sheet of material 32 is sized so that, in one preferred form, the sheet of material 32 substantially covers the entire outer peripheral surface 16 or at least a substantial portion thereof. As shown in FIG. 2, the sheet of material 32 is generally rectangularly shaped and sized so a portion of the sheet of material 32 extends a distance generally upwardly and outwardly from the upper end 12 of the flower pot 10 to form a skirt 50.

Initially, the sheet of material 32 is substantially flat. The flat sheet of material 32 is formed by hand or by a machine up around and about the outer peripheral surface 16 of the flower pot 10.

In operation, the sheet of material 32 is extended about the outer peripheral surface 16 of the flower pot 10 with the lower surface 36 of the sheet of material 52 being disposed generally adjacent the outer peripheral surface 16 of the flower pot 10. The wire 20 is extended through the opening 40 in the sheet of material 32, the wire 22 is extended through the opening 42 in the sheet of material 32, the wire 24 is extended through the opening 44 in the sheet of material 32 and the wire 26 is extended through the opening 46 in the sheet of material 32. The wires 20, 22, 24 and 26 can be extended through the respective openings 40, 42, 44 and 46 and then connected to the upper end 12 of the flower pot 10 or the wires 20, 22, 24 and 26 can be extended through the respective openings 40, 42, 44 and 46 and then the wires 20, 22, 24 and 26 can be interconnected to form the connection 26. In either event, the wires 20, 22, 24 and 26 are connected to the flower pot 10 and to the sheet of material 32 and the wires 20, 22, 24 and 26 cooperate to connect the sheet of material 32 to the flow pot 10 and to maintain the sheet of material 32 positioned about the outer peripheral surface 16 of the flower pot 10 to provide the decorative covering 30, as shown in FIG. 3.

The sheet of material 32 is constructed of material selected from a group of materials consisting of man-made organic polymer film, paper, (treated or untreated), burlap, cloth (natural or synthetic or combination thereof), denim, foil, cling wrap or cellophane or combinations thereof.

In one preferred embodiment, the sheet of material 32 is constructed from a relatively thin film of a substantially non-shape sustaining man-made organic polymer film. The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The sheet of material 32 may be constructed of a single layer of material or a plurality of layers of the same or different types of materials. Any thickness of the sheet of material 32 may be utilized in accordance with the present invention as long as the sheet of material 32 is wrappable about the flower pot 10. Additionally, an insulating material such as bubble film, preferable as one of two layers, can be utilized in order to provide needed protection. In a preferred embodiment, the sheet of material 32 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. In general, the sheet of material 32 has a thickness in a range from less than about 1.0 mils to about 30 mils and preferably the thickness is less than about 6.0 mils.

The term "cling wrap" as used herein may be any material which is capable of connecting to flower pot 10 and/or itself upon contacting engagement and is wrappable about flower pot 10 or 10a whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by GladN, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the upper surface 36 of the sheet of material 32. The term "decorative pattern" as used herein means a color and/or an embossed pattern and/or other decorative surface ornamentation, including, but not limited to printed designs, coatings, flocking or metallic finishes. The sheet of material 32 also may be totally or partially clear or tinted transparent material. It should be noted that a decorative pattern also may be incorporated on or in the lower surface 38 which may be desirable in some applications.

The sheet of material 32 also could be segmented in the manner disclosed in the patent application entitled "Plant Cover/Wrap System, U.S. Ser. No. 149,002, filed on Jan. 27, 1988 and assigned to the assignee of the present invention, and the disclosure of this application hereby specifically is incorporated herein by reference.

FIGS. 4 AND 5 EMBODIMENT

Shown in FIG. 4 is a modified decorative cover 30a. The decorative cover 30a includes the sheet of material 32, however, the sheet of material 32 has been preformed into a predetermined shape having an upper end 52, a lower end 54 and an object opening 56 extending through the upper end 52 thereof. The object opening 52 is sized and shaped for receiving the flower pot 10. When the flower pot 10 is disposed in the object opening 52, the preformed sheet of material 32 extends generally over a substantial portion of the outer peripheral surface 16 of the flower pot 10.

The decorative cover 30a preferably is made by forming the sheet of material 32 between male and female molds in the manner described in the patent entitled "Article Forming System", U.S. Pat. No. 4,773,182, issued on Sep. 27, 1988 and in the co-pending continuation patent application entitled "Article Forming System", U.S. Ser. No. 219,083, filed Jul. 13, 1988, both assigned to the assignee of the present invention, and the disclosure in U.S. Pat. No. 4,773,182 specifically is incorporated herein by reference. The preformed shape of the sheet of material 32a includes a plurality of overlapping folds 58 (only one of the overlapping folds 58 being designated by a reference numeral in FIG. 3). Preferably, the portions of the sheet of material 32a forming the overlapping folds 58 are connected by heat sealing or adhesive or the like. The overlapping folds 58 cooperate to provide structural integrity for aiding the decorative cover 30a in maintaining the predetermined shape.

The decorative cover 30a includes the skirt 50 which extends outwardly and upwardly from the upper end 52 of the preformed shape.

In operation, the flower pot 10 is disposed in the object opening 56, as shown in FIG. 5. The wires 20, 22, 24 and 25 are extended through the respective holes 40, 42, 44 and 46 in decorative cover 30a. The decorative cover 30a with the flower pot 10 disposed in the object opening 56 of the decorative cover 30a is hangingly supported from the support surface 28 via the hook 29 portion of the wires 20, 22, 24 and 25. The wires 20, 22, 24 and 25 are connected to the flower pot 10 and to the decorative cover 30a via the holes 40a, 42a, 44 and 46, and the wires 20, 22, 24 and 25 cooperate to connect the decorative cover 30a to the flower pot 10 and to maintain the decorative cover 30a extended about the outer peripheral surface 16 of the flower pot 10 when the decorative cover 30a and the flower pot 10 are hangingly supported from the support surface 28.

FIGS. 6 AND 7 EMBODIMENT

Shown in FIG. 6 is a sheet of material 32b which is constructed exactly like the sheet of material 32 shown in FIG. 2 including the four holes 40, 42, 44 and 46 (the holes 40, 42, 44 and 46 not being shown in FIG. 6). This embodiment includes four plastic rings 60, 62, 64 and 66 with each ring 60, 62, 64 and 66 having an opening formed through a central portion thereof. Each of the rings 60, 62, 64 and 66 is connected to the sheet of material 32b and each of the rings 60, 62, 64 and 66 extends generally about one of the holes 40, 42, 44 and 46, respectively.

Figure 7:
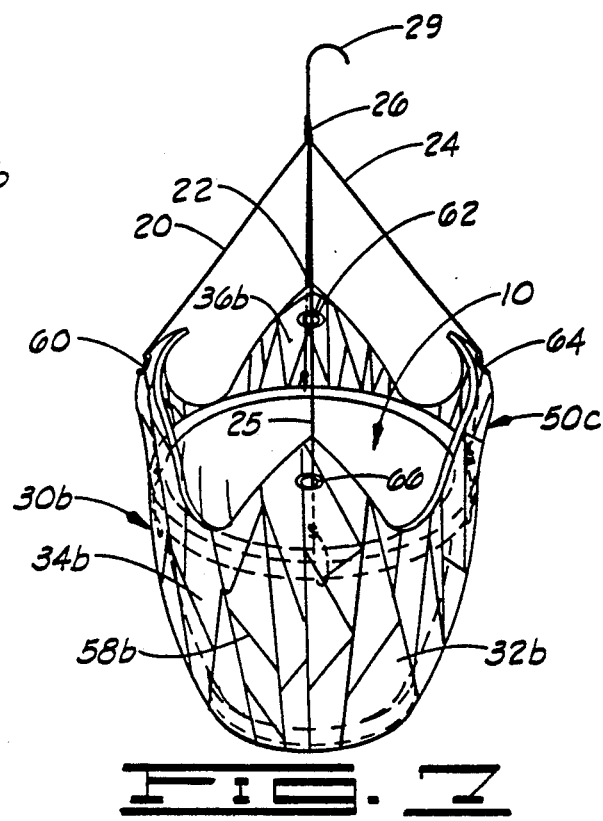
FIG. 7 is a view similar to FIG. 5, but showing the decorative cover made from the sheet of material shown in FIG. 6 supported on the flower pot of FIG. 1.

The sheet of material 32b shown in FIG. 6 is formed about the outer peripheral surface 16a of the flower pot 10, as shown in FIG. 7, to form the decorative cover 30b in the manner like that described before with respect to the decorative cover 30 or, in the alternative, the sheet of material 32b can be preformed into the predetermined shape to form the decorative cover for being disposed about the flower pot 10 in a manner like that described before with respect to the decorative cover 30a. In either event, once the decorative cover 30b is placed about the outer peripheral surface 16 of the flower pot 10, the wires 28b, 22b, 24b and 25b are extended through the openings in the rings 60, 62, 64 and 66 and the wires 20b, 22b, 24b and 25b are interconnected at the connection 26b and form the hook 29b for supporting the decorative cover 30b from the support surface 28. The decorative cover 30b shown in FIG. 7 will operate exactly like the decorative cover 30 or 30a, except the holes 40, 42, 44 and 46 are reinforced with the rings 60, 62, 64 and 66 which may be desired in some applications.

FIGS. 8 AND 9 EMBODIMENT

Figure 8:
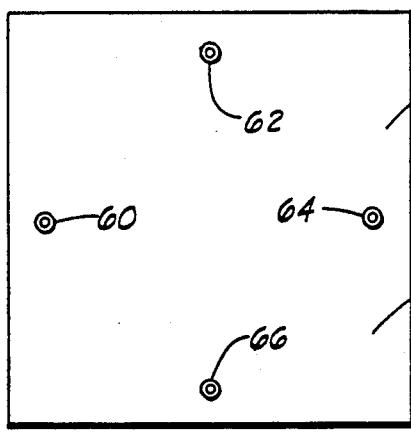
FIG. 8 is a view similar to FIG. 6, but showing a modified sheet of material.

Shown in FIG. 8 is a sheet of material 32c which is constructed exactly like the sheet of material 32b shown in FIG. 6 except the holes 40, 42, 44 and 46 (not shown) are not positioned at the corners of the sheet of material 32c, rather, the holes 40, 42, 44 and 46 are positioned generally midway between the opposite sides and opposite ends of the sheet of material 32c. The plastic rings 60, 62, 64 and 66 each are disposed in one of the holes 40, 42, 44 and 46, respectively, in a manner exactly like that described before with respect to the sheet of material 32b shown in FIG. 6.

Figure 9:
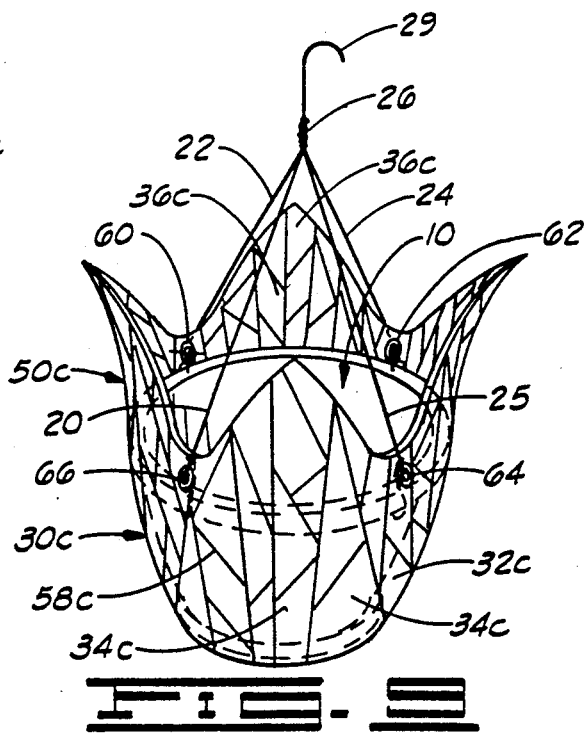
FIG. 9 is a view similar to FIG. 7, but showing a decorative cover made from the sheet of material of FIG. 8 positioned on the flower pot of FIG. 1.

The sheet of material 32c is formed into a decorative cover 30c shown in FIG. 9 in a manner like that described before with respect to the decorative cover 30 or the sheet of material 32c is preformed to a predetermined shape like the decorative cover 30a described before. The decorative cover 30c can support the flower pot 10 from the support surface 28 in a manner like that described before.

Changes may be made in the construction and the operation of the various part, elements and assemblies described herein and changes may be made in the steps or the sequence of steps of the methods described herein without departing from the spirit and scope of the invention as defined in the following claims.

What is claimed is:

1. A decorative cover adapted to use with a hanging basket flower pot adapted to be hangingly supported from a support surface which as an outer peripheral surface, an upper end, a lower end and a pot opening extending through the upper end with the pot opening being sized and shaped for accommodating a floral grouping, the decorative cover comprising:

a thin, flexible sheet of material preformed into a predetermined shape of a pot cover having an upper end, a lower end and an object opening extending through the upper end thereof, the object opening being sized and shaped for receiving the flower pot and the flower pot being disposed in the object opening with the pot cover being disposed adjacent and extending about a substantial portion of the outer peripheral surface of the flower pot, the preformed pot cover having a plurality of overlapping folds extending at various angles and extending over various distances which are connected for cooperating in maintaining the sheet of material in the preformed shape of the pot cover, a plurality of spaced apart holes formed through the sheet of material, the lower end of the flower pot being disposed adjacent the lower end of the pot cover; and a plurality of wire means, each wire means being connected to the flower pot and each wire means extending through one of the holes in the preformed sheet of material, each wire means being connectable to the support surface for hangingly supporting the preformed sheet of material and the flower pot from the support surface and said wire means connecting the sheet of material to the flower pot via the connection made by said wire means extending through the holes in the sheet of material, and said wire means extending through said holes in the sheet of material providing the only connection between the sheet of material and the flower pot.

2. The decorative cover of claim 1 wherein the sheet of material is defined further as being constructed of a material selected from a group of materials consisting of man-made organic polymer film, paper (treated or untreated or combinations thereof), burlap, cloth (natural or synthetic or combinations thereof), denim, foil, cling wrap, or cellophane or combinations thereof.

3. The decorative cover of claim 1 wherein the sheet of material is defined further as including an upper surface and a lower surface with a decorative pattern being on the upper surface, the lower surface of the sheet of material being disposed generally adjacent the outer peripheral surface of the flower pot when the sheet of material is extended about the substantial portion of the outer peripheral surface of the flower pot.

4. The decorative cover of claim 1 wherein the sheet of material is defined further as having a thickness in a range from less than about 1.0 mil to about 30 mils.

5. The decorative cover of claim 1 wherein the sheet of material is defined further as having a thickness of less than about 6.0 mils.

6. The decorative cover of claim 1 wherein a portion of the sheet material extends generally outwardly from the upper end of the preformed shape to form a decorative skirt, the skirt extending generally outwardly from the upper end of the flower pot when the flower pot is disposed in the object opening.

* * * * *

UNITED STATES PATENT AND TRADEMARK OFFICE
CERTIFICATE OF CORRECTION

PATENT NO. : 5,303,506

DATED : April 19, 1994

INVENTOR(S) : Weder et al.

It is certified that error appears in the above-identified patent and that said Letters Patent is hereby corrected as shown below:

On the title page, item [63]:

Under "Related U.S. Application Data", line 6, after the word "abandoned", please delete ", which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned".

Under the "ABSTRACT", line 3, please delete the word "the".

Under "U.S. PATENT DOCUMENTS", page 2, after "3,488,022, please delete "11/1967", and substitute therefore --1/70--.

Column 1, line 13, after the word "abandoned", please delete ", which was a continuation of U.S. Ser. No. 219,083, filed Jul. 13, 1988, now U.S. Pat. No. 4,897,031, which was a continuation of U.S. Ser. No. 004,275, filed Jan. 5, 1987, now U.S. Pat. No. 4,773,182, which was a continuation of U.S. Ser. No. 613,080, filed May 22, 1984, which was abandoned".

Column 2, line 9, after "flower", please insert --pot--.

Column 2, line 63, please delete "52", and substitute therefore --32--.

UNITED STATES PATENT AND TRADEMARK OFFICE
CERTIFICATE OF CORRECTION

PATENT NO. : 5,303,506

DATED : April 19, 1994

INVENTOR(S) : Weder et al.

It is certified that error appears in the above-identified patent and that said Letters Patent is hereby corrected as shown below:

Column 3, line 1, please delete "26", and substitute therefore --25--.

Column 3, line 3, please delete "26", and substitute therefore --25--.

Column 3, line 6, please delete "26", and substitute therefore --25--.

Column 3, line 8, please delete "26", and substitute therefore --25--.

Column 3, line 10, please delete "26", and substitute therefore --25--.

Column 3, line 11, please delete "26", and substitute therefore --25--.

Column 3, line 20, please delete "tion", and substitute therefore --tions--.

Column 4, line 30, please delete "38", and substitute therefore --36--.

Column 4, line 42, please delete the first "32", and substitute therefore --32a--.

UNITED STATES PATENT AND TRADEMARK OFFICE
CERTIFICATE OF CORRECTION

PATENT NO. : 5,303,506

DATED : April 19, 1994

INVENTOR(S) : Weder et al.

It is certified that error appears in the above-identified patent and that said Letters Patent is hereby corrected as shown below:

Column 3, line 42, after "material", please delete "32", and substitute therefore --32a--.

Column 4, line 46, please delete "52", and substitute therefore --56--.

Column 4, line 52, please delete "32", and substitute therefore --32a--.

Column 4, line 55, please delete "co-pending".

Column 4, line 57, please delete "Ser. No. 219,083, filed Jul. 13, 1988, and substitute therefore --U.S. Pat. No. 4,897,031, issued on Jan. 30, 1990,--.

Column 5, line 15, please delete "40a, 42a", and substitute therefore --40 and 42--.

Column 5, line 46, after "wires", please delete "28b, 22b, 24b and 25b", and substitute therefore --20, 22, 24 and 25--.

Column 5, line 48, please delete "20b, 22b, 24b and 25b", and substitute therefore --20, 22, 24 and 25--.

Column 5, line 49, please delete "26b", and substitute therefore --26--.

UNITED STATES PATENT AND TRADEMARK OFFICE
CERTIFICATE OF CORRECTION

PATENT NO. : 5,303,506

DATED : April 19, 1994

INVENTOR(S) : Weder, et al

It is certified that error appears in the above-indentified patent and that said Letters Patent is hereby corrected as shown below:

Column 5, line 49, pleae delete "29b", and substitute therefore --29--.

Signed and Sealed this

Twenty-seventh Day of September, 1994

Attest:

BRUCE LEHMAN

Attesting Officer

Commissioner of Patents and Trademarks